United States Patent [19]
Driedger et al.

[11] Patent Number: 5,231,648
[45] Date of Patent: Jul. 27, 1993

[54] ADAPTIVE EQUALIZER FOR DIGITAL CELLULAR RADIO

[75] Inventors: Mark E. Driedger; James P. Reilly, both of Ontario; Blake S. Toplis, Ottawa, all of Canada

[73] Assignee: Northern Telecom Limited, Montreal, Canada

[21] Appl. No.: 673,563

[22] Filed: Mar. 21, 1991

[51] Int. Cl.[5] .............................................. H03H 7/30
[52] U.S. Cl. ........................................ 375/13; 375/14; 455/33.1
[58] Field of Search ................. 375/14, 100, 101, 102, 375/13; 358/905; 455/304, 303, 295, 312, 65, 33

[56] References Cited
U.S. PATENT DOCUMENTS
3,659,229  4/1972  Milton .................................... 375/14

Primary Examiner—Benedict V. Safourek
Assistant Examiner—T. Ghebretinsae
Attorney, Agent, or Firm—Jean-Pierre Fortin

[57] ABSTRACT

The present invention provides a method of estimating parameters of a mobile radio channel which are used for providing the equalization and synchronization of the radio channel. The channel is modelled as a discrete number of independent Rayleigh-faded propagation paths. First, the relative delay of each path is estimated, using maximum likelihood methods. Using this information, the associated time-varying path weights are then determined using a least-squares fit. This is sufficient information to estimate the impulse response of the channel. The actual equalizer weights are then obtained by inverting the estimated channel impulse response.

10 Claims, 4 Drawing Sheets

ADAPTIVE EQUALIZER FOR DIGITAL CELLULAR RADIO

FIELD OF THE INVENTION

This invention relates to adaptive equalization and synchronization for a narrow band digital cellular TDMA system using QPSK modulation.

BACKGROUND OF THE INVENTION

The new North American Digital Cellular Standard EIA/TIA IS-54 calls for a narrowband digital cellular TDMA system using QPSK modulation to transport a bit rate of 48.6 kb/s in a nominal channel bandwidth of 30 khz.

At this bandwidth, the 900 Mhz digital cellular channel can exhibit frequency selective fading, causing intersymbol interference, which can be remedied by adaptive equalization. The equalization and synchronization tasks in the receiver are complicated by the existence of relatively rapid channel time variations resulting from vehicle motion doppler shifts. Although decision feedback equalizers (DFE) were found to yield the best performance/cost tradeoff in narrowband TDMA cellular channel, known algorithms for directly adapting the equalizer parameters are too slow and do not result in sufficiently accurate estimates of the equalizer parameters. Alternative adaptation algorithms for this type of equalizer were also found to be very signal-processing-intensive and do not have satisfactory tracking capabilities.

There is therefore a need for a method of quickly providing or adapting a decision feedback equalizer with new parameters which will permit correction of frequency selective fading on cellular channels.

There is also a need for a method which provides more accurate estimates of the channel parameters.

Accordingly, it is an object of the present invention to provide a method of quickly and more accurately estimating channel parameters used in adapting an adaptive decision feedback equalizer.

Another object of the present invention is to provide a method of modelling the cellular channel as a superposition of weighted and delayed independent discrete Rayleigh propagation paths.

SUMMARY OF THE INVENTION

The present invention provides a method of estimating parameters of a mobile radio channel which are used for providing the equalization and synchronization of the radio channel. The channel is modelled as a discrete number of independent Rayleigh-faded propagation paths. First, the relative delay of each path is estimated, using maximum likelihood methods. Using this information, the associated time-varying path weights are then determined using a least-squares fit. This is sufficient information to estimate the impulse response of the channel. The actual equalizer weights are then obtained by inverting the estimated channel impulse response.

According to an aspect of the present invention, there is provided a method of estimating the impulse response of a mobile radio channel using adaptive equalization, comprising the steps:

estimating the delay of a first path and the delay of a second propagation path relative a real timing reference, using a maximum likelihood approach;

determining time varying path weights associated with each path using least-squares fits;

performing a channel model estimate using the estimated delays and weights for each path; and determining tap weights using channel inversion for performing a generalized tapped-delay line equalization.

DESCRIPTION OF THE PREFERRED EMBODIMENT

Figure 1:
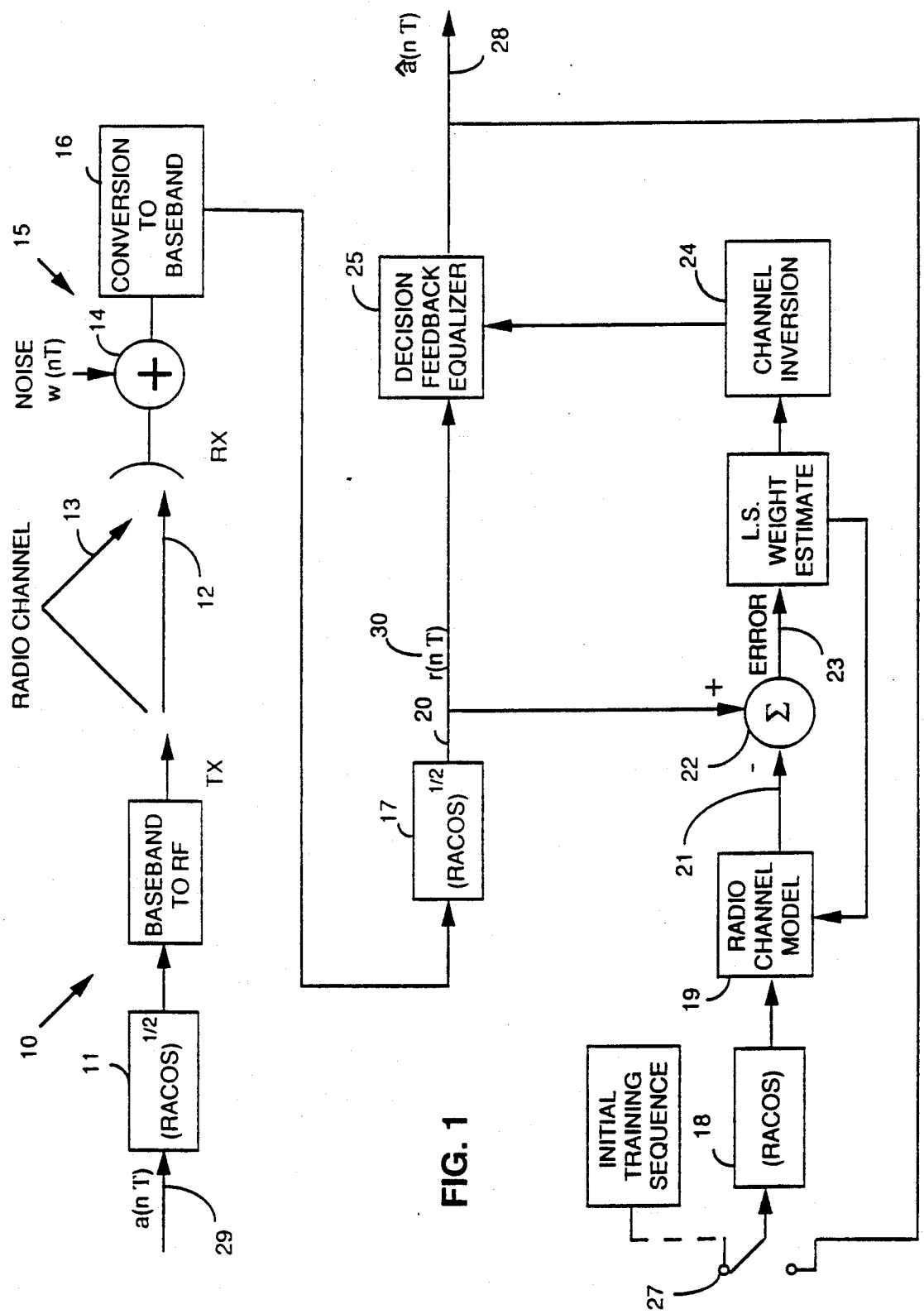
FIG. 1. is block diagram illustrating the adaptive equalization process of the present invention.

Referring now to FIG. 1, we have shown a general block diagram used to illustrate the modelling of a typical radio channel. At the transmit end 10, a signal a(nT) with a predetermined number of bits is passed through a square-root raised cosine pulse shaping filter 11. The symbol T is the symbol period, and n=1, 2, 3, .... Upon transmission, the signal will be affected by various factors, such as frequency selective fading which may cause intersymbol interference. In the method of the present invention, the channel is treated as a linear superposition of delayed multipath components, each with a complex, time varying weight. In the present description, the number of discrete multipath components is assumed to be 2. It is however to be understood by those knowledgeable in this art, that the method can be easily generalized to handle an arbitrary of multipath components. In FIG. 1, the main path 12 can be defined has having a weight of $c_1(nT)$ and a delay $\tau_1$, whereas the delayed path 13 is assumed to have a delay of $\tau_2$ and a weight of $c_2$ (nT). Noise w(nT) is added to the signal along the transmission and is shown in the figure at reference numeral 14. Although noise w(nT) is assumed to be added by the channel, there may be interference from many sources (eg. other cellular users, other man-made interference sources). At the receiving end 15, the signal is converted to baseband 16 and passed through a square-root raised cosine pulse shaping filter 17.

Figure 2:
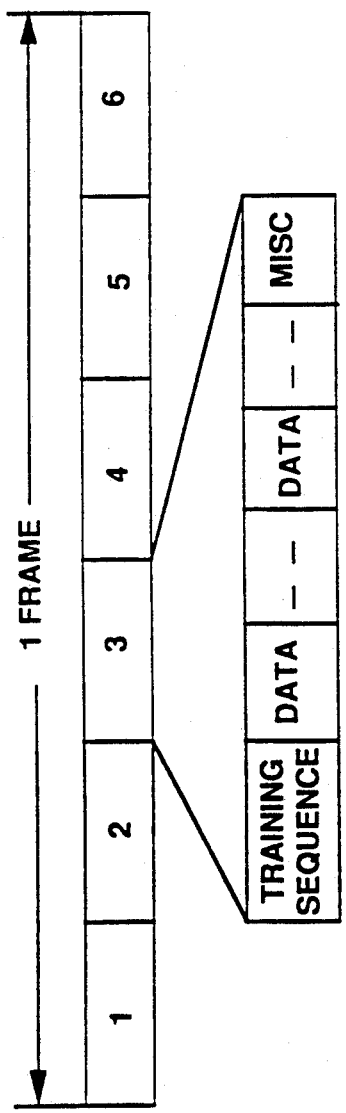
FIG. 2 is an illustration of a bit format for a typical input signal.

A typical bit format for a cellular radio system is shown in FIG. 2. One frame is equal to six (6) slots. Each slot includes an initial training sequence, data and other miscellaneous bits of information. The training sequence for the North American digital cellular standard will contain 14 known symbols for a total of 28 bits.

Figure 3:
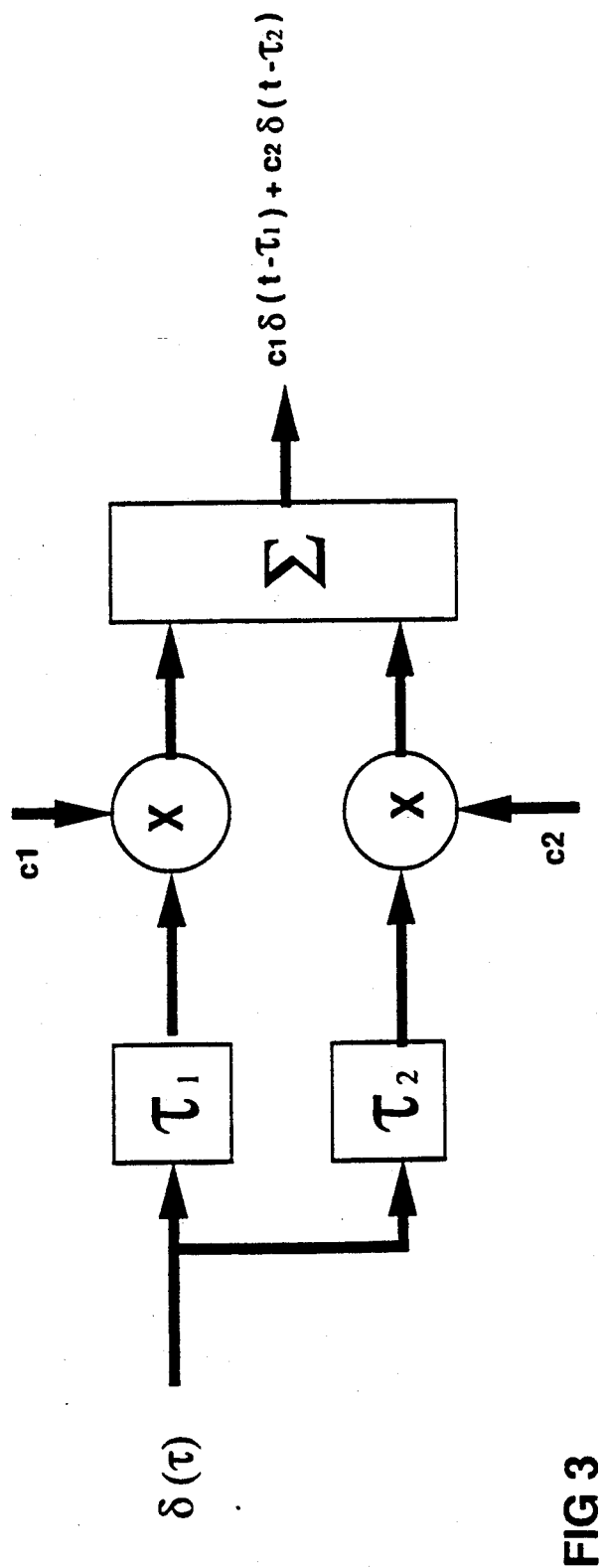
FIG. 3 is a block diagram of a radio channel model.

Referring now to FIG. 3, we have shown a general illustration of the radio channel model (reference numeral 19 of FIG. 1) which is used in the estimation of the channel. The channel is modelled as a discrete number of independent Rayleigh-faded paths, each with their own delays $\tau i$ and relative weights $c_i$, i ∈ [1,2] for the purposes of this discussion. The channel model is characterized by its impulse response h(t), which is given as $$h(t) = c_1\delta(t-\tau_1) + c_2\delta(t-\tau_2) \qquad (1)$$

wherein $\delta(.)$ is the Dirac delta function.

The channel parameters $\tau_i$ and $c_i$ are estimated using statistical algorithms. Once the channel parameters have been determined, the estimated channel response is then specified, and the corresponding equalizer weights may be determined by inverting this estimated response.

Figure 4:
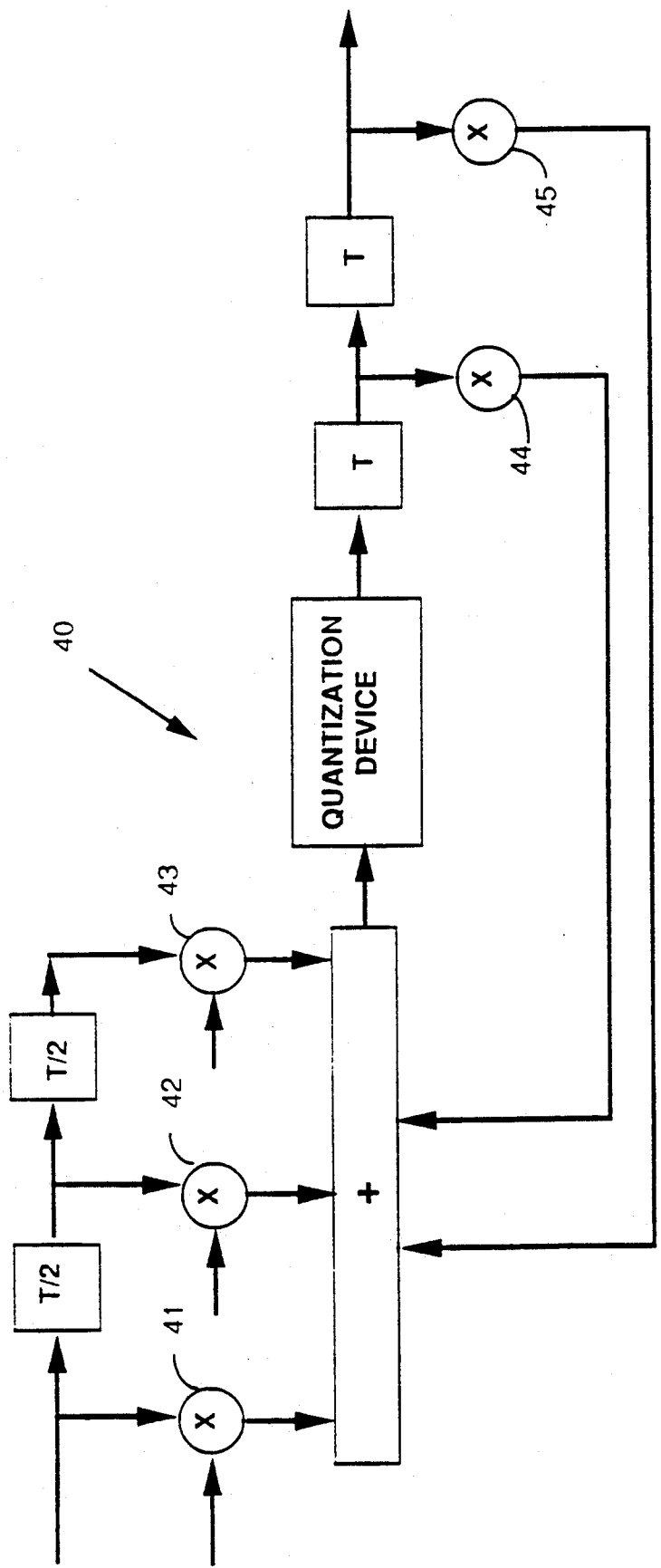
FIG. 4 is a block diagram of a decision feedback equalizer according to an embodiment of the invention.

FIG. 4 is a block diagram of the decision feedback equalizer (block 25 of FIG. 1) used with the present invention. The equalizer structure 40 comprises three (3) T/2-spaced feed-forward taps 41, 42, and 43, and two (2) T-spaced feed-back taps 44 and 45. The equalizer will compute an estimate of the transmitted symbols using received samples and previous decisions. The equalizer coefficients are updated each symbol received.

We now discuss a more detailed description of the parameter estimation algorithm with the aid of the drawings. The training sequence of FIG. 2 is known at the receiver. This provides the receiver with sufficient information to form preliminary channel estimates, which allow reasonable fidelity of operation for the ensuing data sequences. Channel parameters are then continuously updated throughout the remaining portion of the entire slot. It is assumed that the channel weights $c_i$ are relatively quickly varying and require estimation once every symbol, whereas the delays $\tau_i$ are slowly varying, and hence require updating on the order of only once per slot.

During the training sequence phase, the switch 27 on the input of the raised-cosine filter 18 is connected to the "training sequence" box, and the output is fed to the radio channel model circuit 19. It is this circuit which performs the parameter estimation. During the data reception phase, the switch is connected to the lower connection which provides an estimate of the transmitted data. Circuits 18 and 19 together form an auxiliary parallel transmission channel, which is fed either by the training sequence, or by the receiver output data 28. In the latter case, under reliable transmission, the output data is a good approximation to the transmit input data 29. The parameters $\tau_i$ and $c_i$ of this parallel channel are adjusted so that the error 23 produced by the comparator 22, between the actual received signal 20 and the simulated received signal 21, is minimized in some sense.

A maximum likelihood approach which is described following is used to estimate the delays $\tau_i$ and the weights $c_i$. We first discuss how to estimate the vector c given $\tau$, and then show how the vector $\tau_i$ is estimated. Then, given the resulting channel model complete with parameter values, the desired equalizer tap weights are determined using a previously known channel inversion technique.

Consider a time window of length M symbols, where M is small in comparison to the rate of change of the channel. Define the complex vector r(n) as the vector consisting of the received symbols $\{r(nT), r((n+\frac{1}{2})T), \ldots r(n+M-1)T, r((n+M-\frac{1}{2})T)\}$, sample every half-baud according to an internal symbol timing reference where $\{r(.)\}$ is the signal 30 in FIG. 1.

Then:
$$r(n) = z_n(\tau)c(n) + w(n) \quad n = 1, 2, \ldots \quad (2)$$
where
$$z_n(\tau) = [z_1(n)\ z_2(n)] \in C^{2M \times 2} \quad (3)$$

$$z_i(n) = \begin{bmatrix} p_e(\tau_i)^T \cdot a_1(n) \\ p_o(\tau_i)^T \cdot a_1(n) \\ \vdots \\ p_e(\tau_i)^T \cdot a_M(n) \\ p_o(\tau_i)^T \cdot a_M(n) \end{bmatrix} \in C^{2M \times 1}, i \in [1, 2] \quad (4)$$

and $p_e(\tau_i)$ is the real time-reversed raised cosine impulse response of length K, delayed by $\tau_i$ bauds, sampled at even half-bauds.

$p_o(\tau_i)$ is the same, except sampled at odd halfbauds. $a_i(n) = [a_{i+n}, \ldots a_{i+n+k-1}]^T$, $\in C^{K \times 1}$, $i = 0, \ldots, M-1$ is a complex vector of transmitted Symbols.

i.e., each element of $z_1$, $z_2$ is the convolution of the respective transmitted symbols with the raised cosine response. Odd elements of z are sampled at even half-bauds and correspondingly for even elements.

$c(n) \in C^{2 \times 1}$ is the complex vector of multipath channel weights.

$w(n) \in C^{2M \times 1}$ is the complex vector of square-root raised-cosine filtered white noise samples. Assuming that the $\{\tau_i \% 6$ are known, and if the symbols $\}_n$ (item 28 in FIG. 1) are substituted for $\}_n$, then $z_n(\tau)$ is determined. The least-squares estimate $\hat{c}(n)$ of $c(n)$ which minimizes $|w(n)|_2$ in (2) is given as the solution to the following normal equations for non-white noise:

$$(Z^H V^{-1} Z)C = Z^H V^{-1} r \quad (5)$$

where
$$V = E(ww^H) \quad (6)$$

which is the covariance matrix corresponding to the raised cosine response. In (5) the symbols z and c have been substituted for the more exact notations $z_n(\tau)$ and $c(n)$, for convenience.

This completes the discussion on how to estimate c. We now proceed with the discussion on the estimation of $\tau$.

Define the Cholesky factor $U \in C^{M \times m}$ (U is upper triangular) as $$V = U^H U \quad (7)$$

and premultiplying both sides of (2) by $U^{-H}$, we have $$\tilde{r} = \tilde{Z}c + \tilde{w} \quad (8)$$

where the tilde indicates premultiplication of the respective symbol by $U^{-H}$. It is easily shown that $\tilde{w}$ is white.

Since $\tilde{w}$ is iid Gaussian with mean zero and variance $\sigma^2$, we may write the conditional probability of the received data $\tilde{R}_N$ for N independent windows each over M received data symbols as $$p(\tilde{R}_N | c, \tau) \propto \exp\left[ -\frac{1}{\sigma^2} \sum_{j=1}^{N} (\tilde{r}_j - \tilde{Z}_j c)^H (\tilde{r}_j - \tilde{Z}_j c) \right] \quad (9)$$

where
$R = [r_1, \ldots, r_n] \in C^{2M \times N}$ $r_j$ = symbols in jth window sampled every half-band, $j = 1, \ldots, N$.

We may produce a maximum likelihood estimate of $\{c, \tau\}$ by jointly maximizing (9) with respect to these parameters. However, this requires excessive computational effort. The problem may be reduced in dimension eliminating c as follows:

The least-squares estimate of c from (8) is given as $$c_j = (\tilde{Z}_j^H \tilde{Z}_j)^{-1} \tilde{Z}_j^H \tilde{r}_j \tag{10}$$

Substituting (10) into (9), the exponent in (9) becomes $$-\frac{1}{\sigma^2} \sum_{j=1}^{N} \| \tilde{r}_j - \tilde{Z}_j(\tilde{Z}_j^H \tilde{Z}_j)^{-1} \tilde{Z}_j^H \tilde{r}_j \|_2^2 = \tag{11}$$

$$-\frac{1}{\sigma^2} \sum_{j=1}^{N} \| (I - P_j(\tau)) \tilde{r}_j \|_2^2$$

where $P_j(\tau) = Z_j (Z_j^H Z_j)^{-1} Z_j^H$. The matrix $(I - P_j(\tau))$ is the projection operator onto the orthogonal complement subspace of the range of Z.

A maximum likelihood estimate for $\tau$ is then determined as $$\min_\tau \sum_{j=1}^{N} \| (I - P_j(\tau)) \tilde{r}_j \|_2^2 = \max_\tau \sum_{j=1}^{N} \| P_j(\tau) \tilde{r}_j \|_2^2. \tag{12}$$

The above objective function may be made more computationally efficient in many different ways. One example (although the method is not limited to this approach), is to perform a Gram Schmidt decomposition on Z: i.e., $$\tilde{Z} = \tilde{Q} \tilde{R} \tag{13}$$

where $Q \in C^{2M=2}$ has orthonormal columns and is upper triangular (R is not required further). Then $$P_j(\tau) = \tilde{Q}_j \tilde{Q}_j^H \tag{14}$$

where the Q's are implicitly functions of $\tau$. Then the objective function (12) becomes $$\max_\tau \sum_{j=1}^{N} \| \tilde{Q}_j^H \tilde{r}_j \|_2^2 \tag{15}$$

There are many other forms in which the above may be expressed. Also, in practice, the whitening procedure indicated in (5) may not lead to significant performance advantages, and hence may be eliminated if desired. Notice also that the filtering operation discussed here is not restricted only to that of the raised cosine response.

Figure 5:
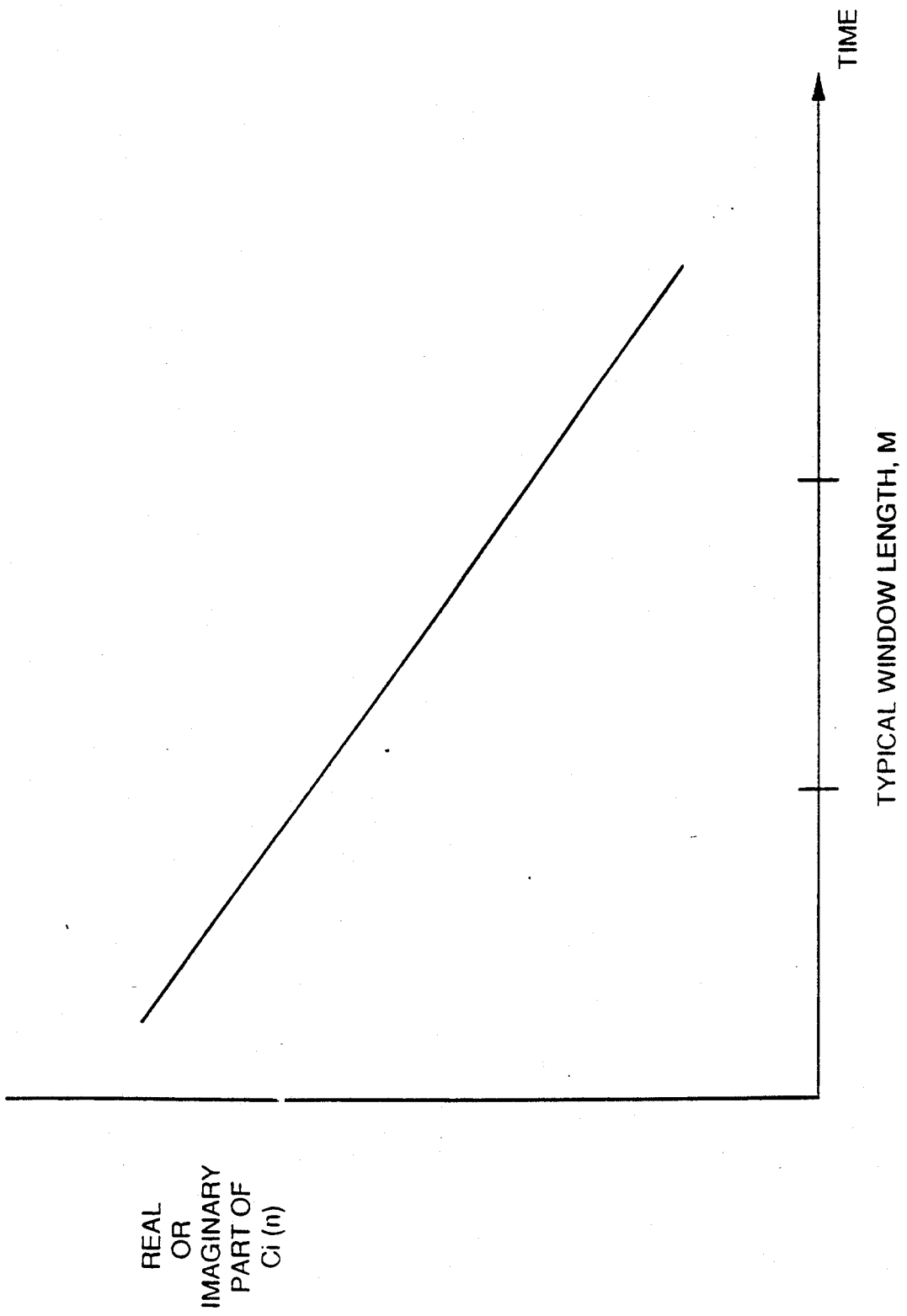
FIG. 5 shows a typical plot of the real and imaginary part of a channel weight versus time.

We now discuss an enhancement to the maximum likelihood method for channel modelling, with the aid of FIG. 5. We refer to this method as "pre-polynomial fitting". This figure shows a typical plot of the real or imaginary part of a channel weight, versus time.

Solving for c using (10) will produce a single estimate which best fits over the entire M-length window. Since the true channel weights may vary significantly over M symbols, a good channel estimate at the current time instant is not necessarily produced.

A simple effective means of compensating this effect is to fit a low-order polynomial (e.g. a straight line) over the window length. That is, each channel weight can be represented as $$c_i = a_i + m b_i, \begin{cases} m = \frac{-(M-1)}{2}, \ldots, \frac{M-1}{2} \\ i = 1, 2 \end{cases} \tag{16}$$

Let the vector $s = [-(M-1)/2, \ldots, (M-1)/2]^T$. To implement this approach, we form the matrix $Z_{pre}$ as follows:

$$Z_{pre} = [z_1, z_2, z_1 \cdot {}^* s, z_2 \cdot {}^* s] \tag{17}$$

where the operator $\cdot^*$ means point-by-point multiplication or element-by-element.

The matrix $Z_{pre}$ is substituted for Z in (10). Solving the vector of unknowns gives $$[a_1, a_2, b_1, b_2]^T \tag{18}$$

from which an estimate c at the current time instant is given by $$c_i = a_i + \frac{(M-1)}{2} \cdot b_i, \; i \in [1, 2]. \tag{19}$$

The advantage of this approach is that nominally, a better fit to the available data at the current time instant is provided. However, for a given amount of data, the more parameters that are estimated, the higher the variance of the individual parameters are. Implementing the pre-polynomial fit doubles the number of parameters and increases the computational complexity of the algorithm. However, simulation results have shown that the net effect of this enhancement is a significant reduction in the bit-error rate of the system.

It is to be understood that this form of enhancement to this proposed invention is not limited solely to the pre-polynomial fit technique as discussed here. There are a wide variety of other possibilities, examples of which include Kalman filtering, or any type of exponentially discounted least squares algorithm such as recursive least squares, etc.

The channel inversion procedure, which generates the equalizer tap weights, based on the channel model is discussed below. This procedure is known to those knowledgeable in this art and need not be discussed in detail.

Let the sequence h(n) represent the estimated complex impulse response of the multipath channel after the receive filter 17 in FIG. 1. The sequence h(n) is the impulse response at point 30 and is a function of the estimated channel parameters. We also define the sequences $h_e(n)$ and $h_o(n)$ each of length K as the even and odd-sampled sequences of h(n) respectively. Furthermore, let $L = N_f + N_b$, where $N_f$ and $N_b$ are the number of forward and backward equalizer taps respectively as shown in FIG. 4. The equalizer weights $[b_1, b_2, \ldots, b_L]^T$ are determined as the solution to the following $L \times L$ system of linear equations:

$$(H + \Psi_N) b = v \tag{20}$$

where $$H = \begin{bmatrix} H_{11} & H_{12} \\ H_{21} & H_{22} \end{bmatrix} \begin{matrix} N_f \\ N_b \end{matrix} \tag{21}$$

-continued $$N_f \quad N_b$$

and $\Psi_N$ is the L×L noise covariance matrix arising from the receiver filter 17 in FIG. 1, when excited by white noise. The L×1 complex vector v is given as $$v = \begin{bmatrix} h_e(noff + 1) \\ h_o(noff) \\ h_e(noff) \\ 0 \\ 0 \end{bmatrix} \quad (22)$$

where noff=(K+1)/2. The block matrix components in (20) are now given, for the specific case where $N_f=3$ and $N_b=2$. It is assumed that $h_e$ and $h_o$ are row vectors of length K:

$$H_{11} = \begin{bmatrix} h_e h_e^H & h_e(2:K)h_o^H(1:K-1) & h_e(2:K)h_e^H(1:K-1) \\ h_o(1:K-1)h_e^H(2:K) & h_o h_o^H & h_o h_e^H \\ h_e(1:K-1)h_e^H(2:K) & h_e h_o^H & h_e h_e^H \end{bmatrix} \quad (23)$$

$$H_{12} = \begin{bmatrix} h_e(noff + 2) & h_e(noff + 3) \\ h_o(noff + 1) & h_o(noff + 2) \\ h_e(noff + 1) & h_e(noff + 2) \end{bmatrix}$$

and $H_{21}=H^H_{12}$, $H_{22}=I_2$. The system of equations (2) is easily generalized to arbitrary values of $N_f$ and $N_b$. This set of equations can be described in terms of expectations of functions of the DFE input and decisions.

Again, there are many other possible techniques for obtaining the equalizer weights from the estimated channel impulse response, other than the inversion technique mentioned here. The proposed invention is not limited to this technique alone.

We claim:

1. In a digital cellular communication system making use of a radio channel for transmitting bursts of data in a TDMA format, each burst comprising a number of data bits and training sequence with a number of symbols known at the transmitter and receiver, a method of performing adaptive equalization of a decision feedback equalizer to permit correction of frequency selective fading on the radio channel, by estimating the impulse response of the radio channel, comprising the steps of:
   sending an initial training sequence, similar to the training sequence of said burst to radio channel modelling means located at said receiver to provide a simulated received signal, said radio channel modelling means simulating at least a first and second channel propagation path;
   receiving a burst from said transmitter on said path;
   comparing the initial training sequence on said simulated received signal with the training sequence of said transmitted burst, to obtain an error signal;
   estimating the relative delay $\tau_i$ of symbols propagated by said first and second propagation paths with respect to a symbol timing reference, to obtain a delay estimate $\tau_{i(est)}$ for each of said path;
   estimating time-varying path weights $C_i$ associated with each of said path, according to said delay estimate $\tau_{i(est)}$;
   performing a channel inversion on both said estimates to obtain a number of equalizer tap weights;
   adjusting a decision feedback equalizer according to said equalizer tap weights, to provide an equalized output; and
   sending said equalized output to said radio channel modelling means to minimize said error signal.

2. A method as defined in claim 1, wherein the relative delays $\tau_i$ of symbols propagated by said first and second propagation paths are estimated with respect to an internal symbol timing reference at said receiver means.

3. A method as defined in claim 2, wherein said estimation is done using a maximum-likelihood estimation procedure.

4. A method as defined in claim 1, wherein the time varying path weights Ci are estimated by using a prepolynomial fitting procedure.

5. A method as defined in claim 1, wherein said training sequence is sent once.

6. A method as defined in claim 5, wherein said path weights are estimated once every symbol.

7. A method as defined in claim 6, wherein said path delays are estimated once per burst.

8. A method as defined in claim 1, wherein said channel model is characterized by an impulse response h(t), wherein $$h(t)=C_1\delta(t-\tau_1)+C_2\delta(t-\tau_2).$$

9. In a digital cellular communication system making use of a radio channel for transmitting bursts of data in a TDMA format, each burst comprising a number of data bits and a training sequence with a number of symbols known at the transmitter and receiver, an improved decision feedback equalizer making use of adaptive equalization to permit correction of frequency selective fading on the radio channel, by estimating the impulse response of the radio channel, comprising:
   radio channel modelling means located at said receiver adapted to receive an initial training sequence similar to the training sequence of said burst and adapted to provide a simulated received signal, said radio channel modelling means comprising at least a first and second channel propagation path;
   means for comparing the initial training sequence of said simulated received signal with the training sequence of said transmitted burst, to obtain an error signal;
   means for estimating the relative delay $\tau_i$ of symbols propagated by said first and second propagation paths with respect to a symbol timing reference, to obtain a delay estimate $\tau_{i(est)}$ for each of said path;
   means for estimating time-varying path weights $C_i$ associated with each of said path, according to said delay estimate $\tau_{i(est)}$;

channel inversion means for inverting both said estimates to obtain a number of equalizer tap weights; and means for adjusting the decision feedback equalizer according to said equalizer tap weights, to provide an equalized output, said equalized output being sent to said radio channel modelling means to minimize said error signal.

10. An improved decision feedback equalizer as defined in claim 8, wherein said channel model is characterized by an impulse response h(t), wherein $$h(t) = C_1\delta(t-\tau_1) + C_2\delta(t-t_2).$$

* * * * *